(12) United States Patent
Yoon

(10) Patent No.: US 10,086,755 B2
(45) Date of Patent: Oct. 2, 2018

(54) MAT INCLUDING LED SAFETY TRIPOD FOR AUTOMOBILE

(71) Applicant: TUTUM CO., LTD., Seongnam-si (KR)

(72) Inventor: Jang Hyuk Yoon, Seoul (KR)

(73) Assignee: TUTUM CO., LTD., Seongnam-si (KR)

( * ) Notice: Subject to any disclaimer, the term of this patent is extended or adjusted under 35 U.S.C. 154(b) by 0 days.

(21) Appl. No.: 15/869,403

(22) Filed: Jan. 12, 2018

(65) Prior Publication Data

US 2018/0134214 A1 May 17, 2018

Related U.S. Application Data

(63) Continuation of application No. PCT/KR2015/014145, filed on Dec. 22, 2015.

(30) Foreign Application Priority Data

Jul. 22, 2015 (KR) .......................... 10-2015-0103849

(51) Int. Cl.
*B60Q 1/00* (2006.01)
*B60Q 7/00* (2006.01)
*B60N 3/04* (2006.01)
*B60Q 1/26* (2006.01)

(52) U.S. Cl.
CPC ............... *B60Q 7/00* (2013.01); *B60N 3/04* (2013.01); *B60N 3/044* (2013.01); *B60N 3/048* (2013.01); *B60Q 1/26* (2013.01)

(58) Field of Classification Search
CPC ............................... G05D 1/0011; B60Q 7/00
USPC ....... 359/515; 116/63 P, 63 R; 340/908, 901, 340/902, 903, 904, 905, 539.1
See application file for complete search history.

(56) References Cited

FOREIGN PATENT DOCUMENTS

| KR | 1020120012586 A | 2/2012 |
|---|---|---|
| KR | 1020130087806 A | 8/2013 |
| KR | 101348694 B1 | 1/2014 |
| KR | 1020140092177 A | 7/2014 |

OTHER PUBLICATIONS

International Search Report of PCT/KR2015/014145, dated Apr. 22, 2016, English translation.

*Primary Examiner* — Daryl Pope
(74) *Attorney, Agent, or Firm* — STIP Law Group, LLC

(57) ABSTRACT

According to the mat including an LED safety tripod for an automobile, since an LED module is disposed on a triangular safety plate, a driver approaching from behind can easily see the triangular safety plate even in overcast conditions and at night. Further, according to the present invention, a triangular safety plate is integrally formed on the rear side of an automotive mat body, so it is possible to minimize the volume of a triangular safety plate and allow a driver to naturally carry a triangular safety plate without a specific effort.

18 Claims, 8 Drawing Sheets

MAT INCLUDING LED SAFETY TRIPOD FOR AUTOMOBILE

CROSS-REFERENCE TO RELATED APPLICATIONS

This application is a continuation of Application No. PCT/KR2015/014145, filed Dec. 22, 2015 which in turn claims the benefit of Korean Patent Application No. 10-2015-0103849, filed Jul. 22, 2015, the disclosures of which are incorporated by reference into the present application.

TECHNICAL FIELD

The present invention relates to a mat for an automobile and, more particularly, to a mat including an LED tripod for an automobile.

BACKGROUND ART

A safety tripod is equipment that is installed at a predetermined place behind a vehicle when the vehicle breaks down on or has an emergency on a road to prevent a safety accident by alerting drivers in vehicles approaching from behind. In existing safety tripods, a warning mark is attached to the front of a triangular sign plate, supporting legs protruding down are coupled to both sides of the bottom of the sign plate, and a rotatable support extending downward is coupled to the center portion of the rear side of the sign plate so that the tripods can be folded and stowed in the trunk, etc. of vehicles.

These safety tripods of the related art are formed in a simple red triangular shape, so there was a problem that they cannot be easily recognized by drivers approaching from behind. Further, there was a problem that drivers have to separately purchase and then carry the safety tripods, which occupy a large space in a vehicle, in specific spaces in a vehicle.

In relation to these safety tripods, there are Korean Patent No. 10-1348694 (registered on Dec. 31, 2013, titled "Light-emitting triangular warning device") and Korean Patent Application Publication No. 10-2013-0087806 (published on Aug. 7, 2013, titled "Safety tripod for vehicle and keeping method of safety tripod").

DISCLOSURE

Technical Problem

The present invention has been made in an effort to solve the problems described above in the related art and an object of the present invention is to provide a mat including an LED safety tripod for an automobile, the mat having an LED module on a triangular safety plate so that drivers approaching from behind can easily see the plate even in overcast conditions and at night.

Another object of the present invention is to provide a mat including an LED safety tripod for an automobile, the mat minimizing the volume of a triangular safety plate and allowing a driver to naturally carry a safety tripod even without a specific effort, by having a configuration in which the triangular safety plate is integrally formed on the rear side of an automotive mat body.

Technical Solution

A mat including an LED safety tripod for a vehicle according to the present invention to achieve the objects includes:

an automotive mat body;

a triangular safety plate disposed on a rear side of the automotive mat body with a side coupled to the rear side of the automotive mat body and two sides being detachable; and an LED module disposed in a first triangle corresponding to edges of the triangular safety plate.

Preferably, the automotive mat body may have a seat for inserting the triangular safety plate on the rear side.

Preferably, the automotive mat body may have a nonskid bottom designed to prevent sliding.

More preferably, the triangular safety plate or the seat on the rear side of the automotive mat body may include a fluorescent reflective material or a light emitting element.

Preferably, the automotive mat body may be a common automotive mat or a double mat.

Preferably, the automotive mat body may have a double structure of a top plate and a bottom plate, in which the top plate may be a common existing automotive mat or a double mat and the bottom plate may be made of a harder material than the top plate.

Preferably, the rear side of the automotive mat body and a side of the triangular safety plate may be coupled by a hinge coupler.

Preferably, the automotive mat body include a lock that keeps the triangular safety plate folded in a normal state and keeps the triangular safety plate erected when unlocked.

More preferably, the lock may include a triangular safety plate-fixing pin on the automotive mat body.

More preferably, the lock may be configured such that when the triangular safety plate-fixing pin is positioned over and presses the triangular safety plate, the triangular safety plate keeps folded, and when the triangular safety plate-fixing pin is turned not to press the triangular safety plate, the triangular safety plate is erected.

Preferably, the automotive mat body and the triangular safety plate may be locked by a locking step and a locking hook.

More preferably, the LED module may be automatically turned on when the lock is unlocked and the triangular safety plate is erected.

More preferably, the LED module may be automatically turned off at a predetermined angle when the triangular safety plate is folded back toward the mat.

More preferably, the LED module may display any one selected from full lighting, left-turn lighting, and right-turn lighting patterns.

More preferably, the left-turn lighting and right-turn lighting patterns may be displayed by not a half arrow, but a full arrow by installing an additional LED module on the rear side of the automotive mat body in addition to the existing LED module.

More preferably, the mat may further include a memory in which the LED patterns are stored in advance.

Preferably, the mat may further include a support fixing the triangular safety plate when the triangular safety plate is erected at a predetermined angle with two sides detached from the automotive mat body.

More preferably, the support may include one or more foldable rods on the rear side of the automotive mat body.

More preferably, the support may be configured such that ends of the foldable rods are coupled at a predetermined angle to a rear side of the triangular safety plate to support and fix the triangular safety plate that has been erected.

More preferably, the support may include springs fixed to the rear side of the automotive mat body.

Advantageous Effects

According to the mat including an LED safety tripod for an automobile, since an LED module is disposed on a triangular safety plate, a driver approaching from behind can easily see the triangular safety plate even in overcast conditions and at night.

Further, according to the present invention, a triangular safety plate is integrally formed on the rear side of an automotive mat body, so it is possible to minimize the volume of a triangular safety plate and allow a driver to naturally carry a triangular safety plate without a specific effort.

REFERENCE NUMERALS

Figure 1:
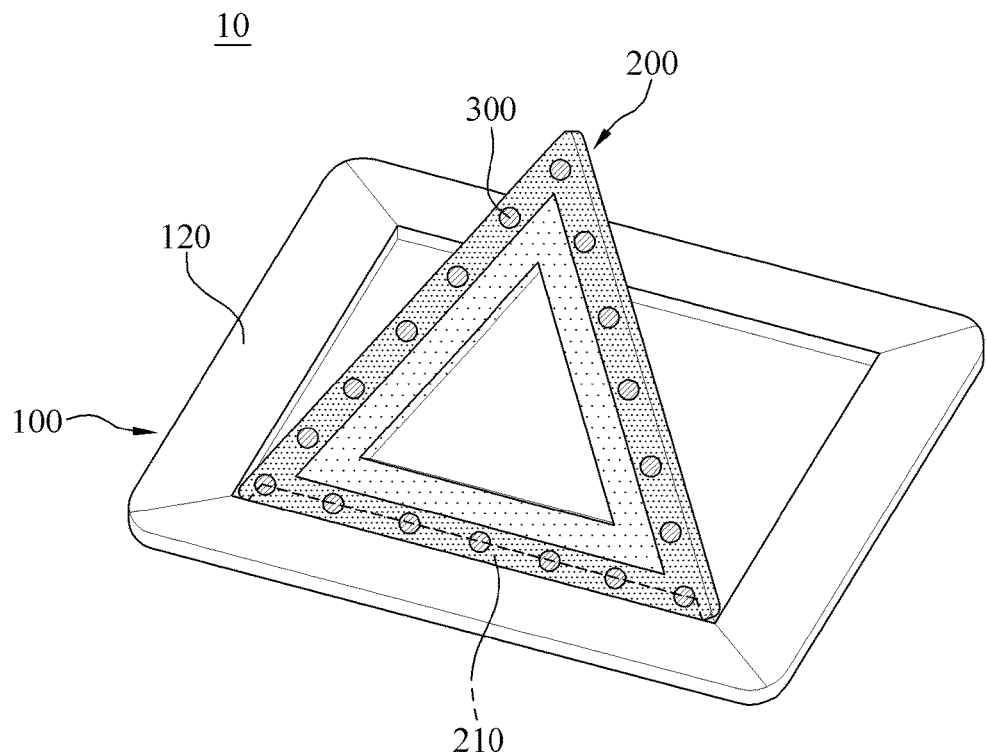
FIG. 1 is a perspective view showing the configuration of a mat including an LED safety module for an automobile according to an embodiment of the present invention.

10: Mat including LED safety tripod for vehicle according to embodiment of the present invention
100: Automotive mat body
110: Top plate of automotive mat body
120: Bottom plate of automotive mat
130: Locking step
140: Switch
200: Triangular safety plate
210: Hinge coupler
220: Locking hook
230: First triangle
300: LED module
400: Lock
410: Triangular safety plate-fixing pin
500: Memory

BEST MODE

Exemplary embodiments for those skilled in the art to easily accomplish the present invention are described hereafter in detail with reference to the accompanying drawings. However, in the following description of exemplary embodiments of the present invention, when it is determined that detailed description of related well-known functions or configurations may make the spirit of the present invention unclear, they are not described in detail. Further, parts having similar functions and operations are given the same or similar reference numerals throughout the drawings.

Further, throughout the specification, it should be understood that when one element is referred to as being "connected to" another element, it may include not only a case in which one element is "connected directly" to another element, but a case in which one element is "connected to another element" with another element intervening therebetween. Further, unless described otherwise, "including" any components will be understood to imply the including of other components but not the exclusion of any other components.

FIG. 1 is a perspective view showing the configuration of a mat 10 including an LED safety module for an automobile according to an embodiment of the present invention. As shown in FIG. 1, the mat 10 including an LED safety module for an automobile according to an embodiment of the present invention may include an automotive mat body 100, a triangular safety plate 200, and an LED module 300.

Hereinafter, the components of the mat 10 including an LED safety module for an automobile proposed by the present invention are described in detail.

The automotive mat body 100, which is intended to be laid on the floor in a vehicle, prevents sliding, prevents dirt from scattering and spreading by absorbing dust entering the vehicle, and protects the floor of the vehicle from scratching. According to an embodiment, the automotive mat body 100 may have a nonskid bottom designed to prevent sliding.

Figure 2:
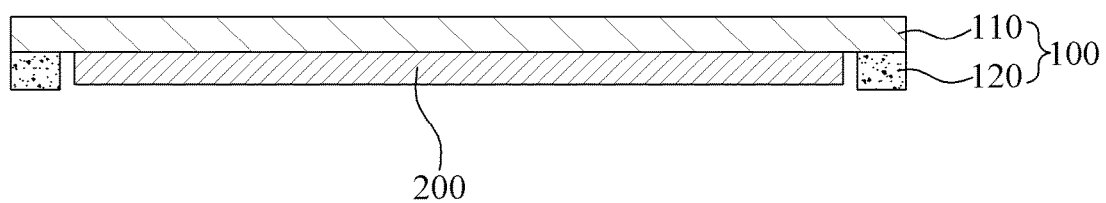
FIG. 2 is a side view showing a seat formed to insert a triangular safety plate on the rear side of an automotive mat body having a double structure of a top plate and a bottom plate in the mat including an LED safety module for an automobile according to an embodiment of the present invention.

The automotive mat body 100 has a double structure and may have a seat to insert a triangular safety plate 200 on the rear side. FIG. 2 is a side view showing a seat formed to insert the triangular safety plate 200 on the rear side of an automotive mat body 100 having a double structure of a top plate 110 and a bottom plate 120 in the mat including an LED safety module for an automobile according to an embodiment of the present invention. As shown in FIG. 2, the automotive mat body 100 may have a double structure of the top plate 110 and the bottom plate 120, and depending on embodiments, the top plate 110 and the bottom plate 120 may be separated from each other or may be bonded to each other in a single unit. In the mat including an LED safety module for an automobile according to an embodiment of the present invention, the top plate 110 of the automotive mat body 100 may be a common mat or a double mat for a vehicle used in the art and the bottom plate 120 may be made of a harder material than the top plate 110. The double mat, which is composed of a top mat and a bottom mat, traps dirt such as dust or soil to the bottom mat when dirt drops on the top mat and prevents backflow of the dirt, thereby improving sanitation in a vehicle. Further, as shown in FIG. 2, a seat in which the triangular safety plate 200 can be inserted is formed on the rear side of the automotive mat body 100.

Further, the automotive mat body 100 may have a fluorescent reflective material or a light emitting element in the seat on the rear side in which the triangular safety plate 200 can be inserted so that a warning mark can be shown even if the triangular safety plate 200 is removed.

Figure 3:
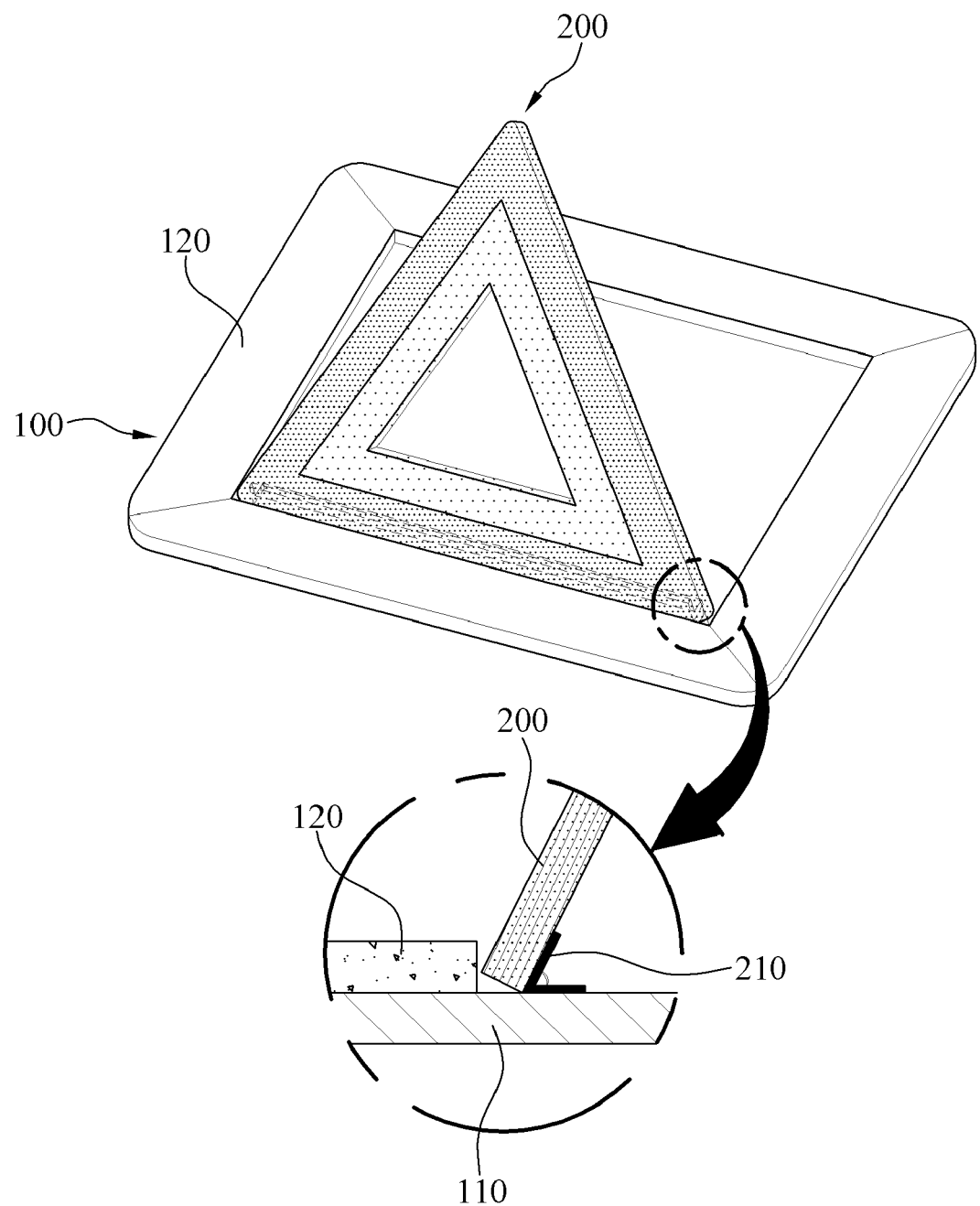
FIG. 3 is a view showing a hinge coupler the automotive mat body and the triangular safety plate in the mat including an LED safety module for an automobile according to an embodiment of the present invention.

FIG. 3 is a view showing a hinge coupler the automotive mat body 100 and the triangular safety plate 200 in the mat 100 including an LED safety module for an automobile according to an embodiment of the present invention. As shown in FIG. 3, the rear side of the automotive mat body 100 and a side of the triangular safety plate 200 can be coupled by a hinge coupler 210.

Further, the automotive mat body 100 may further have a lock 400 that keeps the triangular safety plate 200 folded in a normal state and keeps the triangular safety plate 200 erected when it is unlocked.

Figure 4A:
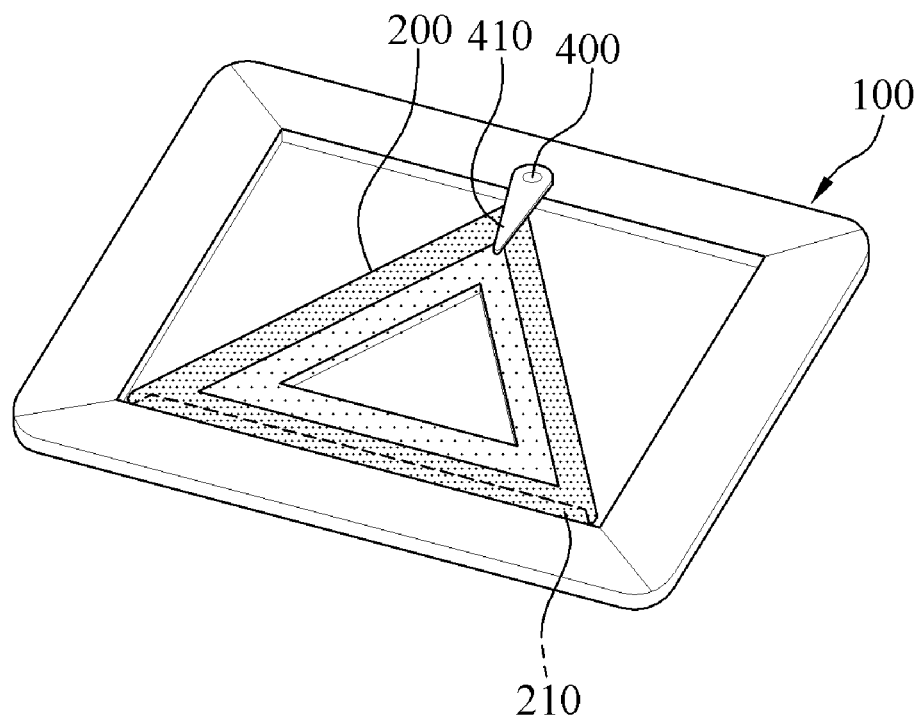
FIG. 4A and FIG. 4B are views showing states in which the triangular safety plate is not erected by a lock and the triangular safety plate is erected with the lock unlocked in the mat including an LED safety module for an automobile according to an embodiment of the present invention.
Figure 4B:
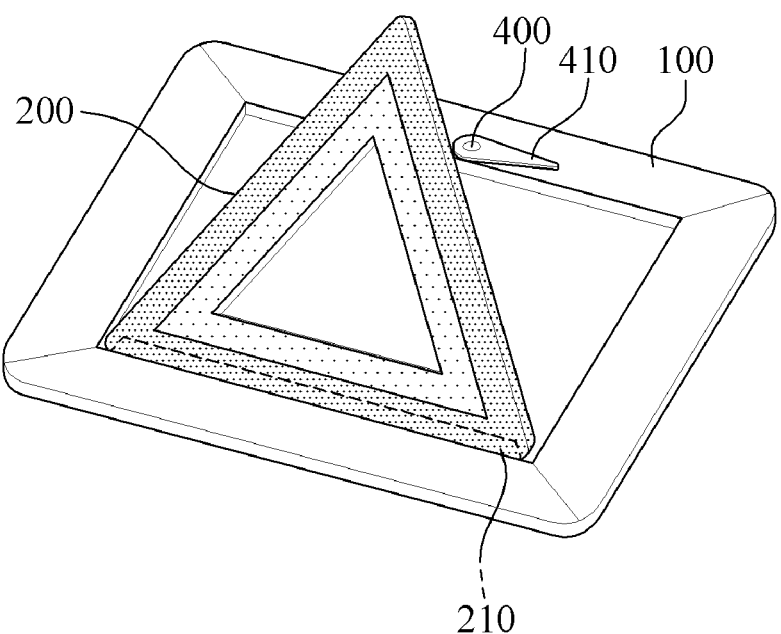

The lock 400 may include a triangular safety plate-fixing pin 410 on the automotive mat body 100. FIG. 4A and FIG. 4B are views showing states in which the triangular safety plate 200 is not erected by the lock 400 and the triangular safety plate 200 is erected with the lock 400 unlocked in the mat including an LED safety module for an automobile according to an embodiment of the present invention. According to the lock 400, when the triangular safety plate-fixing pin 410 is positioned over and presses the triangular safety plate 200, the triangular safety plate 200 keeps folded, as shown in FIG. 4A, and when the triangular safety plate-fixing pin 410 is turned not to press the triangular safety plate 200, the triangular safety plate 200 can be erected. The lock 400 is not limited to the lock 400 using the triangular safety plate-fixing pin 410 and may be implemented in various ways as long as it can keep the triangular safety plate 200 folded when it is locked, and keep the triangular safety plate 200 erected only when it is unlocked.

Figure 5:
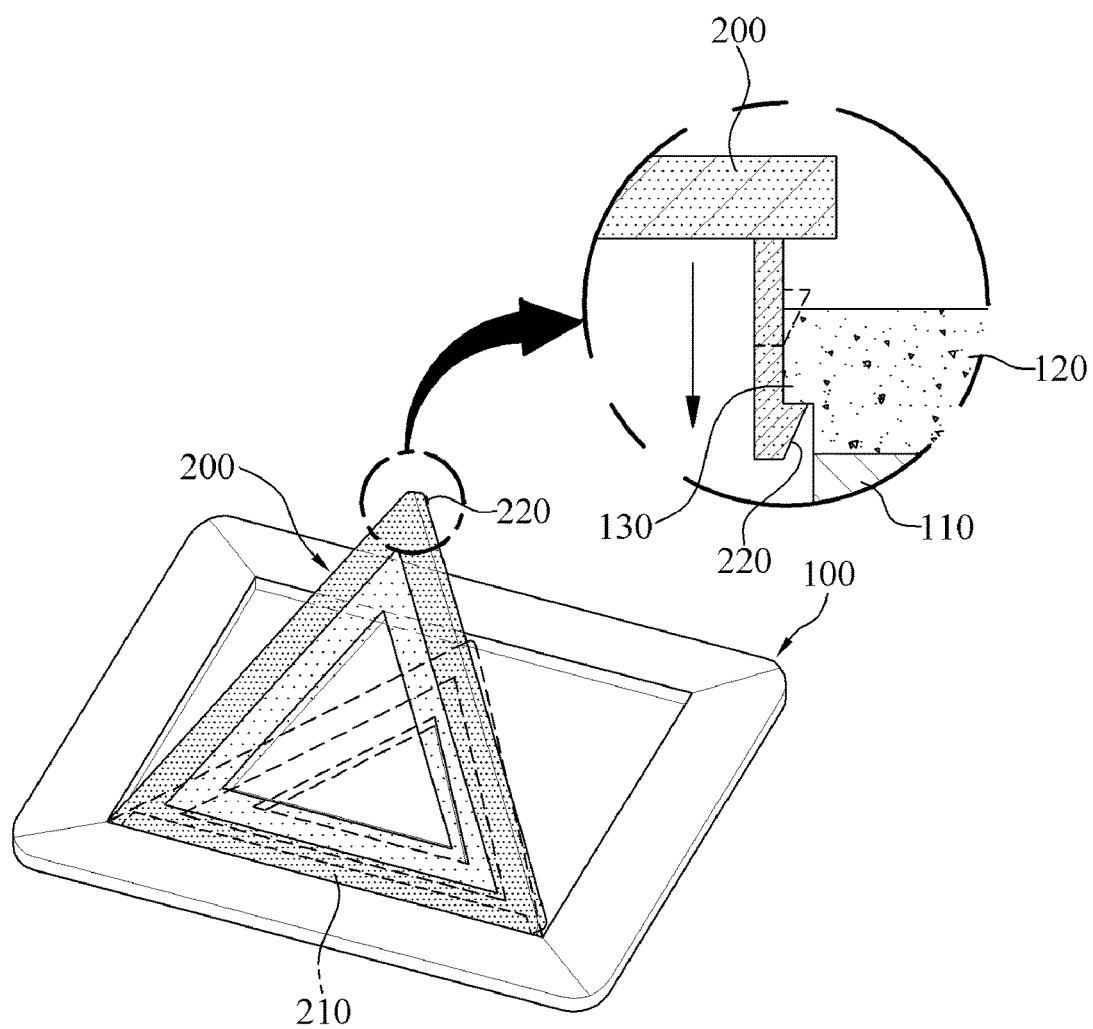
FIG. 5 is a view showing a state in which the automotive mat body and the triangular safety plate are locked by a locking step and a locking hook in the mat including an LED safety module for an automobile according to an embodiment of the present invention.

FIG. 5 is a view showing a state in which the automotive mat body 100 and the triangular safety plate 200 are locked by a locking step 130 and a locking hook 220 in the mat including an LED safety module for an automobile according to an embodiment of the present invention. As shown in FIG. 5, according to another embodiment of the present invention, the automotive mat body 100 and the triangular safety plate 200 may be locked by the locking step 130 and the locking hook 220. That is, when the triangular safety plate 200 is folded down in the seat of the automotive mat body 100, the triangular safety plate 200 can be fixed to the automotive mat body 100 by the locking step 130 and the locking hook 220. According to this configuration, it is possible to prevent the triangular safety plate 200 from being separated or pulled out from the seat.

The triangular safety plate 200 may be disposed on the rear side of the automotive mat body 100 with a side coupled to the rear side of the automotive mat body 100 and the other two sides being detachable. Further, the warning mark of the triangular safety plate 200 may be implemented by a fluorescent reflective material or light emitting devices (LEDs, etc.) so that a driver in a following vehicle can easily see the warning mark. Further, depending on embodiments, the triangular safety plate 200 may be formed in a detachable type.

Figure 6A:
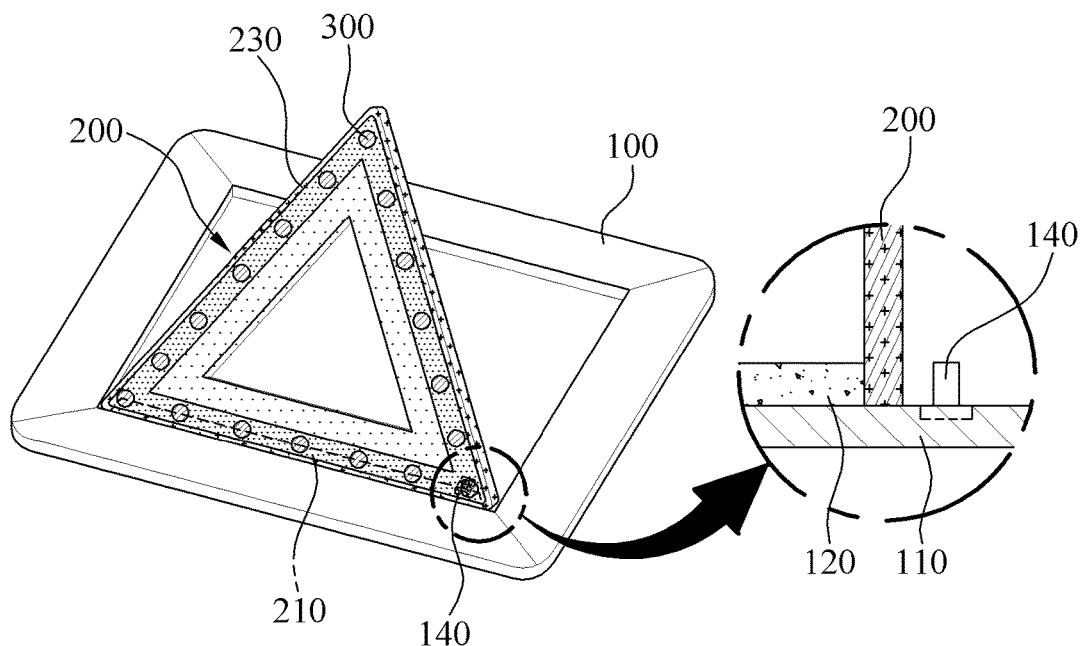
FIG. 6A and FIG. 6B are views showing a state in which the lock is unlocked, the triangular safety plate is erected, a switch is automatically turned on, and an LED module is turned on, and a state in which when the triangular safety plate is folded back toward the mat, the switch is turned off at a predetermined angle and the LED module is turned off, in the mat including an LED safety module for an automobile according to an embodiment of the present invention.
Figure 6B:
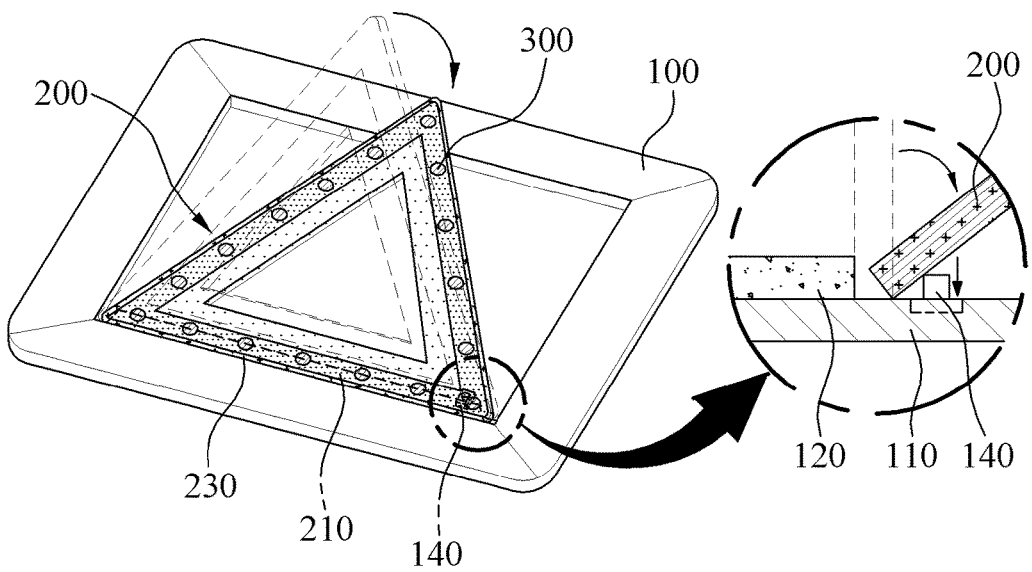

Further, the triangular safety plate 200 may have an LED module 300 in a first triangle 230 corresponding to the edges. FIG. 6A and FIG. 6B are views showing a state in which the lock 400 is unlocked, the triangular safety plate 200 is erected, a switch 140 is automatically turned on, and the LED module 300 is turned on, and a state in which when the triangular safety plate 200 is folded back toward the mat, the switch 140 is turned off at a predetermined angle and the LED module 300 is turned off, in the mat including an LED safety module for an automobile according to an embodiment of the present invention. As shown in FIG. 6A, when the lock 40 is unlocked, the triangular safety plate 200 is erected and the switch 140 that been pressed and turned off by the triangular safety plate 200 is turned on, so the LED module 300 can be turned on. Further, as shown in FIG. 6B, when the triangular safety plate 200 is folded back toward the mat, the switch 140 is pressed and turned off at a predetermined angle, so the LED module 300 can be turned off. The configuration of turning on/off the LED module 300 by turning on/off the switch is just an embodiment and various other methods such as using a sensor for automatically turning on the LED module 300 when the triangular safety plate 200 is erected and turning off the LED module 300 at a predetermined angle when the triangular safety plate 200 is folded back toward the mat may be used.

Figure 7A:
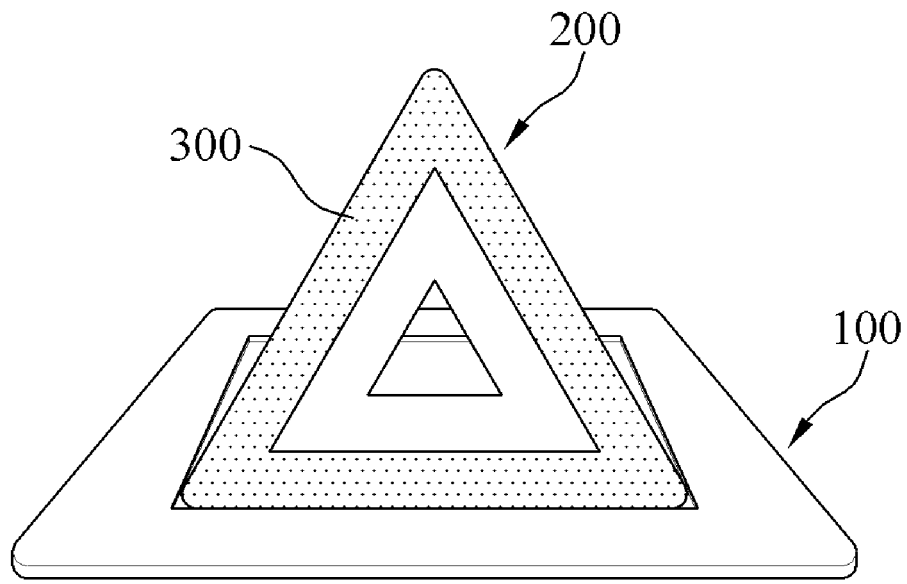
FIG. 7A, FIG. 7B, and FIG. 7C are views showing the LED module in full lighting, left-turn lighting, and right-turn lighting in the mat including an LED safety module for an automobile according to an embodiment of the present invention.
Figure 7B:
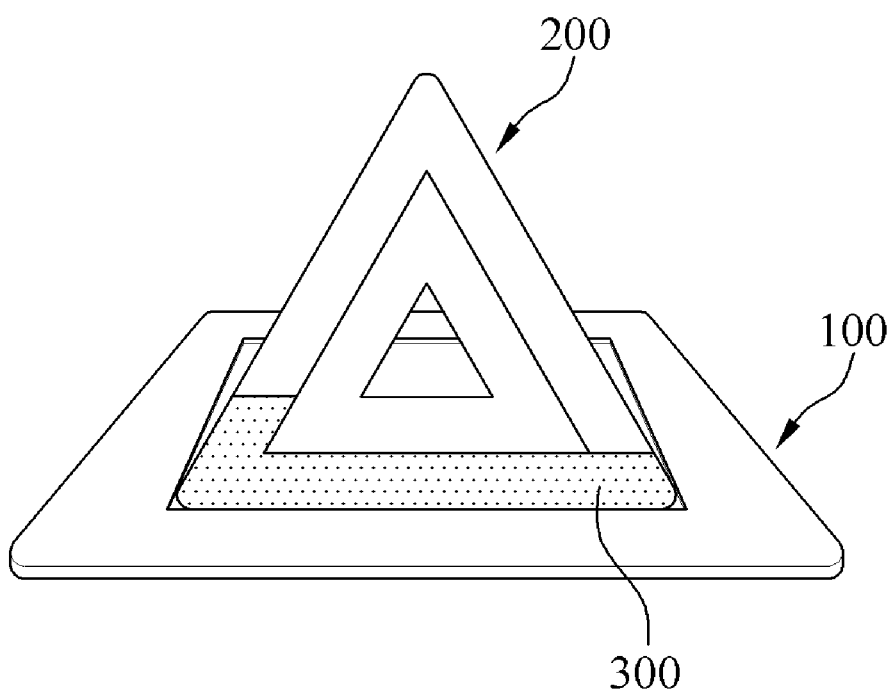
Figure 7C:
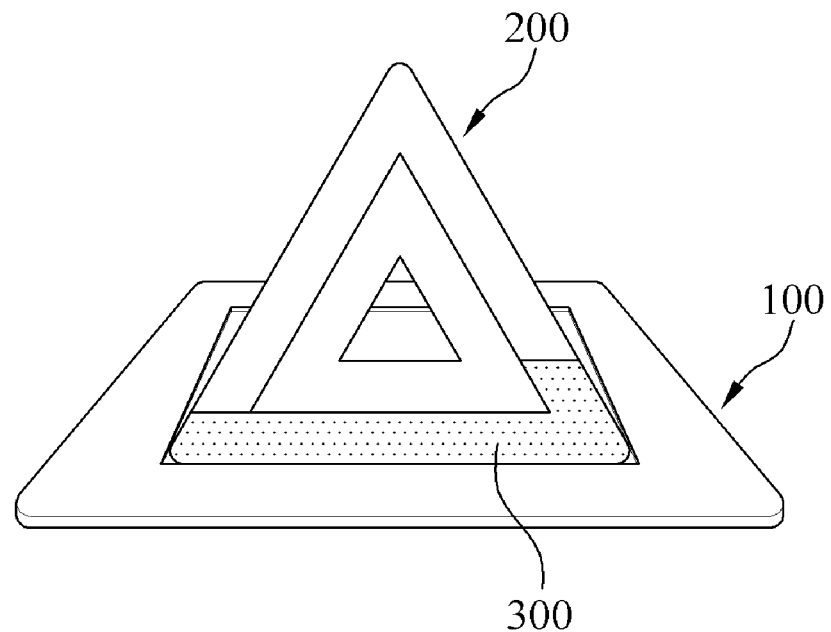

The LED module 300 shows any one pattern selected from full lighting, left-turn lighting, and right-turn lighting patterns. FIG. 7A, FIG. 7B, and FIG. 7C are views showing the LED module in full lighting, left-turn lighting, and right-turn lighting in the mat including an LED safety module for an automobile according to an embodiment of the present invention. As shown in FIG. 7A, FIG. 7B, and FIG. 7C, any one pattern selected by a user from the full lighting, left-turn lighting, and right-turn lighting patterns can be displayed by the LED module 300.

Figure 8A:
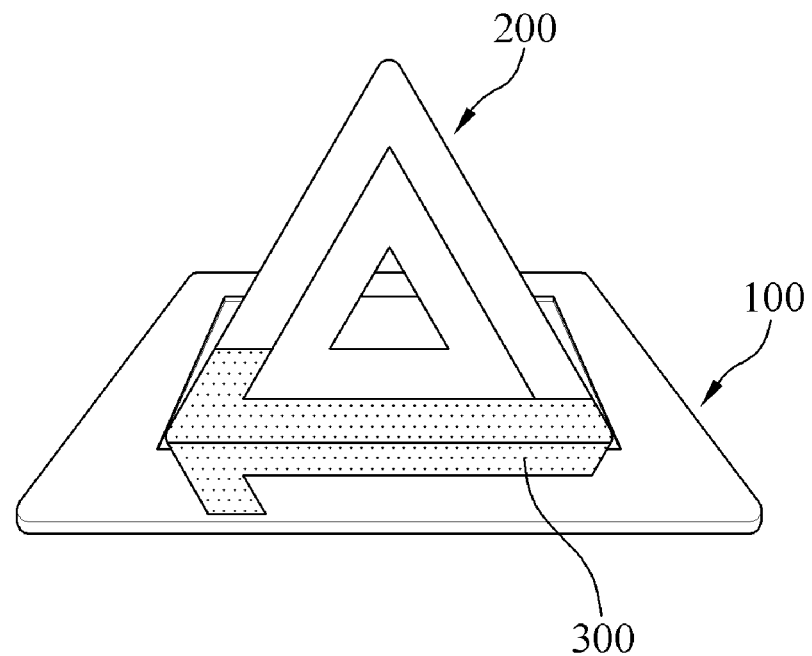
FIG. 8A and FIG. 8B are views showing left-turn lighting and right-turn lighting displayed by a full arrow formed by an LED module additionally disposed on the rear side of the automotive mat body and the existing LED module on the triangular safety plate in the mat including an LED safety module for an automobile according to an embodiment of the present invention.
Figure 8B:
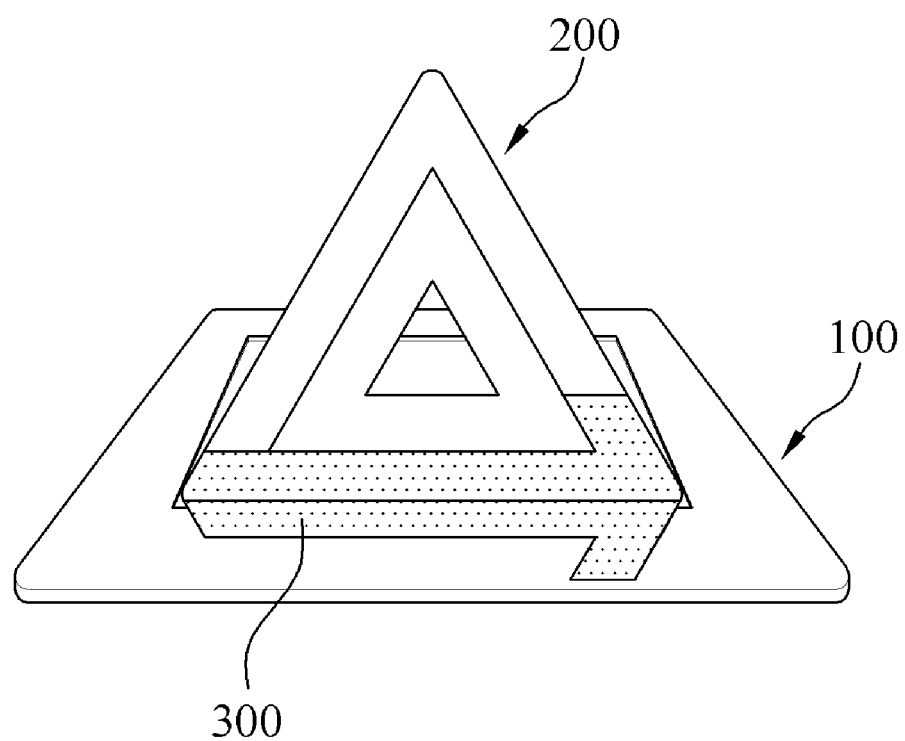

Further, the left-turn lighting and right-turn lighting patterns may be displayed by not a half arrow, but a full arrow by installing an additional LED module 300 on the rear side of the automotive mat body 100 in addition to the existing LED module 300. FIG. 8A and FIG. 8B are views showing left-turn lighting and right-turn lighting displayed by a full arrow formed by an LED module 300 additionally disposed on the rear side of the automotive mat body and the existing LED module 300 on the triangular safety plate 200 in the mat including an LED safety module for an automobile according to an embodiment of the present invention. As shown in FIG. 8A and FIG. 8B, an LED module 300 is additionally disposed on the rear side of the automotive mat body 100 to form a full arrow pattern, so a driver approaching from behind can easily see the arrow even in overcast conditions and at night.

Further, the automotive mat body 100 or the triangular safety plate 200 may further include a memory 500 in which LED pattern can be stored in advance.

A support fixes the triangular safety plate 200 when the triangular safety plate 200 is erected at a predetermined angle with two sides detached from the automotive mat body 100. Further, the support may include one or more foldable rods on the rear side of the automotive mat body 100. Ends of the foldable rods are coupled at a predetermined angle to the rear side of the triangular safety plate 200, so the foldable rods can support and fix the triangular safety plate 200 that has been erected.

Further, the foldable rods of the support may be configured in various ways for example to support a portion around the apex of the triangular safety plate 200 or two sides of the triangular safety plate 200. Further, the support may be composed of springs fixed to the rear side of the automotive mat body 100. That is, when the mat for an automobile is laid with the front up, the springs on the rear side of the automotive mat body 100 are compressed by the weight of the automotive mat body 100 and the triangular safety plate 200 is folded. When the mat for an automobile is turned over with the bottom up to be used as a safety tripod, the springs at the left and right sides of the triangular safety plate 200 are stretched and the triangular safety plate 200 is erected at a predetermined angle.

Therefore, according to the present invention, since the mat for an automobile includes an LED safety tripod, a driver approaching from behind can easily see the tripod even in overcast conditions and at night, and a driver can naturally carry a safety tripod without specific attention or effort.

The present invention described above may be changed and modified in various ways by those skilled in the art and the scope of the present invention should be determined on the basis of the following claims.

The invention claimed is:

1. A mat including an LED safety tripod for a vehicle, the mat comprising:
   an automotive mat body;
   a triangular safety plate disposed on a rear side of the automotive mat body with a side coupled to the rear side of the automotive mat body and two sides being detachable; and
   an LED module disposed in a first triangle corresponding to edges of the triangular safety plate,
   wherein the automotive mat body includes a lock that keeps the triangular safety plate folded in a normal state and keeps the triangular safety plate erected when unlocked,
   the LED module is automatically turned on when the lock is unlocked and the triangular safety plate is erected, and
   the automotive mat body has a double structure of a top plate and a bottom plate and the bottom plate is made of a harder material than the top plate.

2. The mat of claim 1, wherein the automotive mat body has a seat for inserting the triangular safety plate on the rear side.

3. The mat of claim 1, wherein the automotive mat body has a nonskid bottom designed to prevent sliding.

4. The mat of claim 2, wherein the triangular safety plate or the seat on the rear side of the automotive mat body includes a fluorescent reflective material or a light emitting element.

5. The mat of claim 1, wherein the automotive mat body is a double mat.

6. The mat of claim 1, wherein the rear side of the automotive mat body and a side of the triangular safety plate are coupled by a hinge coupler.

7. The mat of claim 1, wherein the lock includes a triangular safety plate-fixing pin on the automotive mat body.

8. The mat of claim 7, wherein the lock is configured such that when the triangular safety plate-fixing pin is positioned over and presses the triangular safety plate, the triangular safety plate keeps folded, and when the triangular safety plate-fixing pin is turned not to press the triangular safety plate, the triangular safety plate is erected.

9. The mat of claim 1, wherein the automotive mat body and the triangular safety plate are locked by a locking step and a locking hook.

10. The mat of claim 1, wherein the LED module is automatically turned off at a predetermined angle when the triangular safety plate is folded back toward the mat.

11. The mat of claim 1, wherein the LED module displays any one selected from full lighting, left-turn lighting, and right-turn lighting patterns.

12. The mat of claim 11, wherein the left-turn lighting and right-turn lighting patterns are displayed by not a half arrow, but a full arrow by installing an additional LED module on the rear side of the automotive mat body in addition to the existing LED module.

13. The mat of claim 11, further comprising a memory in which the LED patterns are stored in advance.

14. The mat of claim 1, further comprising a support fixing the triangular safety plate when the triangular safety plate is erected at a predetermined angle with two sides detached from the automotive mat body.

15. The mat of claim 14, wherein the support includes one or more foldable rods on the rear side of the automotive mat body.

16. The mat of claim 15, wherein the support is configured such that ends of the foldable rods are coupled at a predetermined angle to a rear side of the triangular safety plate to support and fix the triangular safety plate that has been erected.

17. The mat of claim 14, wherein the support includes springs fixed to the rear side of the automotive mat body.

18. The mat of claim 1, wherein the bottom plate is in direct contact with a surface of the top plate and forms a recess such that the triangular safety plate is capable of being placed in the recess.

* * * * *